US009578610B2

(12) United States Patent
Womack et al.

(10) Patent No.: US 9,578,610 B2
(45) Date of Patent: *Feb. 21, 2017

(54) SYSTEM AND METHOD FOR UPLINK TIMING SYNCHRONIZATION IN CONJUNCTION WITH DISCONTINUOUS RECEPTION

(71) Applicant: BlackBerry Limited, Waterloo (CA)

(72) Inventors: James Earl Womack, Bedford, TX (US); Zhijun Cai, Ashburn, VA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/884,287

(22) Filed: Oct. 15, 2015

(65) Prior Publication Data

US 2016/0037468 A1    Feb. 4, 2016

Related U.S. Application Data

(63) Continuation of application No. 14/074,070, filed on Nov. 7, 2013, now Pat. No. 9,215,696, which is a (Continued)

(51) Int. Cl.
*G08C 17/00*    (2006.01)
*H04W 56/00*    (2009.01)
(Continued)

(52) U.S. Cl.
CPC ........ *H04W 56/0005* (2013.01); *H04L 5/0094* (2013.01); *H04L 27/2662* (2013.01); *H04W 52/0216* (2013.01); *H04W 52/0225* (2013.01); *H04W 72/04* (2013.01); *H04W 72/0413* (2013.01); *H04W 76/048* (2013.01);
(Continued)

(58) Field of Classification Search
None
See application file for complete search history.

(56) References Cited

U.S. PATENT DOCUMENTS 7,400,642 B2    7/2008  Koo et al.
7,680,071 B2    3/2010  Bultan et al.
(Continued)

FOREIGN PATENT DOCUMENTS

EP    1 722 294    11/2006
EP    1 816 883    8/2007
(Continued)

OTHER PUBLICATIONS

"3rd Generation Partnership Project: Technical Specification Group Radio Access Network; Evolved Universal Terrestrial Radio Access (E-UTRA); Physical Channels and Modulation (Release 8)" 3GPP TS 36.211 V8.1.0, Nov. 2011.
(Continued)

*Primary Examiner* — Kibrom T Hailu

(74) *Attorney, Agent, or Firm* — Fish & Richardson P.C.

(57) ABSTRACT

Systems and methods for controlling sounding reference signal transmission are provided; a user equipment starts transmitting the sounding reference signal in anticipation of uplink data transmission, and then discontinues transmitting the sounding reference signal after completion of uplink data transmission.

24 Claims, 11 Drawing Sheets

Related U.S. Application Data continuation of application No. 12/052,539, filed on Mar. 20, 2008, now Pat. No. 8,606,336.

(51) Int. Cl.
| | |
|---|---|
| *H04L 27/26* | (2006.01) |
| *H04W 52/02* | (2009.01) |
| *H04W 72/04* | (2009.01) |
| *H04W 76/04* | (2009.01) |
| *H04L 5/00* | (2006.01) |
| *H04W 48/08* | (2009.01) |
| *H04W 84/04* | (2009.01) |

(52) U.S. Cl.
CPC ............ *H04L 5/003* (2013.01); *H04L 5/0016* (2013.01); *H04L 5/0048* (2013.01); *H04L 5/0053* (2013.01); *H04W 48/08* (2013.01); *H04W 84/042* (2013.01)

(56) References Cited

U.S. PATENT DOCUMENTS

| | | | |
|---|---|---|---|
| 7,778,151 | B2 | 8/2010 | Bertrand et al. |
| 7,844,265 | B2 | 11/2010 | Kuchibhotla et al. |
| 8,023,442 | B2 | 9/2011 | Kim et al. |
| 8,169,957 | B2* | 5/2012 | Damnjanovic ... H04W 52/0216 370/318 |
| 8,238,837 | B2 | 8/2012 | Womack et al. |
| 8,265,682 | B2 | 9/2012 | Bertrand et al. |
| 8,606,336 | B2 | 12/2013 | Womack et al. |
| 2005/0047429 | A1 | 3/2005 | Koo et al. |
| 2007/0133479 | A1 | 6/2007 | Montojo et al. |
| 2007/0286080 | A1 | 12/2007 | Kim et al. |
| 2007/0287468 | A1 | 12/2007 | Jeong et al. |
| 2007/0291673 | A1 | 12/2007 | Demirhan et al. |
| 2007/0291728 | A1 | 12/2007 | Dalsgaard et al. |
| 2008/0075036 | A1* | 3/2008 | Bertrand ............ H04W 74/04 370/328 |
| 2008/0080472 | A1 | 4/2008 | Bertrand et al. |
| 2008/0101268 | A1 | 5/2008 | Sammour et al. |
| 2008/0101280 | A1 | 5/2008 | Gholmieh et al. |
| 2008/0101306 | A1* | 5/2008 | Bertrand ............ H04L 27/2613 370/336 |
| 2008/0181127 | A1 | 7/2008 | Terry et al. |
| 2008/0182596 | A1 | 7/2008 | Wang et al. |
| 2008/0186892 | A1 | 8/2008 | Damnjanovic |
| 2008/0186893 | A1 | 8/2008 | Kolding et al. |
| 2008/0198795 | A1 | 8/2008 | Kim et al. |
| 2008/0200203 | A1 | 8/2008 | Malladi et al. |
| 2008/0207150 | A1 | 8/2008 | Malladi et al. |
| 2008/0267105 | A1 | 10/2008 | Wang et al. |
| 2008/0280638 | A1 | 11/2008 | Malladi et al. |
| 2008/0316961 | A1 | 12/2008 | Bertrand et al. |
| 2009/0122736 | A1 | 5/2009 | Damnjanovic et al. |
| 2009/0180414 | A1* | 7/2009 | Maeda ................ H04B 7/2643 370/311 |
| 2009/0239568 | A1* | 9/2009 | Bertrand .......... H04W 52/0225 455/522 |
| 2014/0313955 | A1 | 10/2014 | Womack et al. |

FOREIGN PATENT DOCUMENTS

| | | |
|---|---|---|
| EP | 2 388 958 | 11/2011 |
| EP | 2 388 959 | 11/2011 |
| KR | 10-2008-0067273 A | 7/2008 |
| WO | 2006/043782 | 4/2006 |
| WO | 2007/087842 | 8/2007 |
| WO | 2007/145035 | 12/2007 |
| WO | 2007/149993 | 12/2007 |

OTHER PUBLICATIONS

"Final Report of 3GPP TSG RAN WG2 meeting #61, Sorrento, Italy, Feb. 11-15, 2008" TSG-RAN Working Group 2 Meeting #61bis R2-081445 Shenzhen, China, Mar. 31-Apr. 4, 2008.

"On Maintenance of UL Synchronization" 3GPP TSG RAN WG1 #49 Kobe, Japan, May 7-11, 2007 R1-072279.

"Report of 3GPP TSG RAN WG1 #52 v2.0.0 (Sorrento, Italy, Feb. 11-15, 2008)" 3GPP TSG RAN WG1 Meeting #52bis R1-081574 Shenzhen, China, Mar. 31-Apr. 4, 2008.

3GPP TSG-RAN2 Meeting #60, Jeju, South Korea, Nov. 5-9, 2007, "Clean up and update on security, scheduling, mobility, MBMS and DRX", R2-075449 (change request).

Panasonic, "CQI Reporting During DRX Operation," 3GPP TSG RAN WG2 #61, R2-080871, Feb. 11-15, 2008, pp. 1-3, XP 002483073.

Research in Motion; SRS Transmission Support in DRX Mode; TSG-RAN WG2 #61, R2-080808, Feb. 11-15, 2008, pp. 1-2, XP-00248309.

Samsung, "CQI Report Transmission Using PUSCH Resource," 3GPP TSG RAN WG1 Meeting #49BIS, R1-073118, Jun. 25-29, 2007, pp. 1-2 XP-002483089.

Texas Instruments, "Scheduling Request and dRX," 3GPP TSG RAN WG1 #48bis, R1-071472, St. Julians, Malta, Mar. 26-30, 2007, 5 pages.

Texas Instruments, "Sounding Reference Signal in Support of Scheduling Request in E-UTRA," 3GPP TSG RAN WG1 #52, R1-080700, Feb. 11-15, 2008, pp. 1-7, Sorrento, Italy, Retrieved from the Internet: URL: http://www_quintillion_co_jp/ 3GPP!TSG_RAN2008!TSG_RAN_WG1_RL1_2_html, retrieved from the internet Aug. 5, 2009.

European Search Report in European Application No. 11177132.5, dated Oct. 21, 2011, 10 pages.

Extended European Search Report in European Application No. 08153883.7, dated Jun. 19, 2008, 9 pages.

Extended European Search Report in European Application No. 11177135.8, dated Oct. 21, 2011, 10 pages.

International Search Report in International Application No. PCT/US2009/037828, dated Oct. 30, 2009, 4 pages.

* cited by examiner

SYSTEM AND METHOD FOR UPLINK TIMING SYNCHRONIZATION IN CONJUNCTION WITH DISCONTINUOUS RECEPTION

This application is a continuation application of U.S. patent application Ser. No. 14/074,070, filed Nov. 7, 2013, which is a continuation application of U.S. patent application Ser. No. 12/052,539, filed Mar. 20, 2008, and issued as U.S. Pat. No. 8,606,336 on Dec. 10, 2013, the disclosure of both are incorporated herein by reference in their entirety.

BACKGROUND

In traditional wireless telecommunications systems, transmission equipment in a base station transmits signals throughout a geographical region known as a cell. As technology has evolved, more advanced network access equipment has been introduced that can provide services that were not possible previously. This advanced network access equipment might include, for example, an enhanced node-B (eNB) rather than a base station or other systems and devices that are more highly evolved than the equivalent equipment in a traditional wireless telecommunications system. Such advanced or next generation equipment is typically referred to as long-term evolution (LTE) equipment. For LTE equipment, the region in which a wireless device can gain access to a telecommunications network might be referred to by a name other than "cell", such as "hot spot". As used herein, the term "cell" will be used to refer to any region in which a wireless device can gain access to a telecommunications network, regardless of whether the wireless device is a traditional cellular device, an LTE device, or some other device.

Devices that might be used by users in a telecommunications network can include both mobile terminals, such as mobile telephones, personal digital assistants, handheld computers, portable computers, laptop computers, tablet computers and similar devices, and fixed terminals such as residential gateways, televisions, set-top boxes and the like. Such devices will be referred to herein as user equipment or UE.

In wireless communication systems, transmission from the network access equipment (e.g., eNB) to the UE is referred to as a downlink transmission. Communication from the UE to the network access equipment is referred to as an uplink transmission. Wireless communication systems generally require maintenance of timing synchronization to allow for continued communications. Maintaining uplink synchronization can be problematic, wasting throughput and/or decreasing battery life of a UE given that a UE may not always have data to transmit.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

According to one broad aspect, the application provides a method of uplink reference signal transmission in a user equipment comprising: starting uplink reference signal transmission in anticipation of transmitting uplink data; transmitting uplink data after starting uplink reference signal transmission; continuing uplink reference signal transmission until completion of transmission of the uplink data.

According to another broad aspect, the application provides a computer readable medium having computer executable instructions stored thereon for implementing a method comprising: starting uplink reference signal transmission in anticipation of transmitting uplink data; transmitting uplink data after starting uplink reference signal transmission; continuing uplink reference signal transmission until completion of transmission of the uplink data.

According to another broad aspect, the application provides a user equipment comprising: a receive module; an uplink signal generation module that starts generating the uplink reference signal in anticipation of transmitting uplink data and continues to generate uplink reference signals until completion of transmission of the uplink data; and a transmit module configured to transmit the uplink data and to transmit the uplink reference signals generated by the uplink signal generation module.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
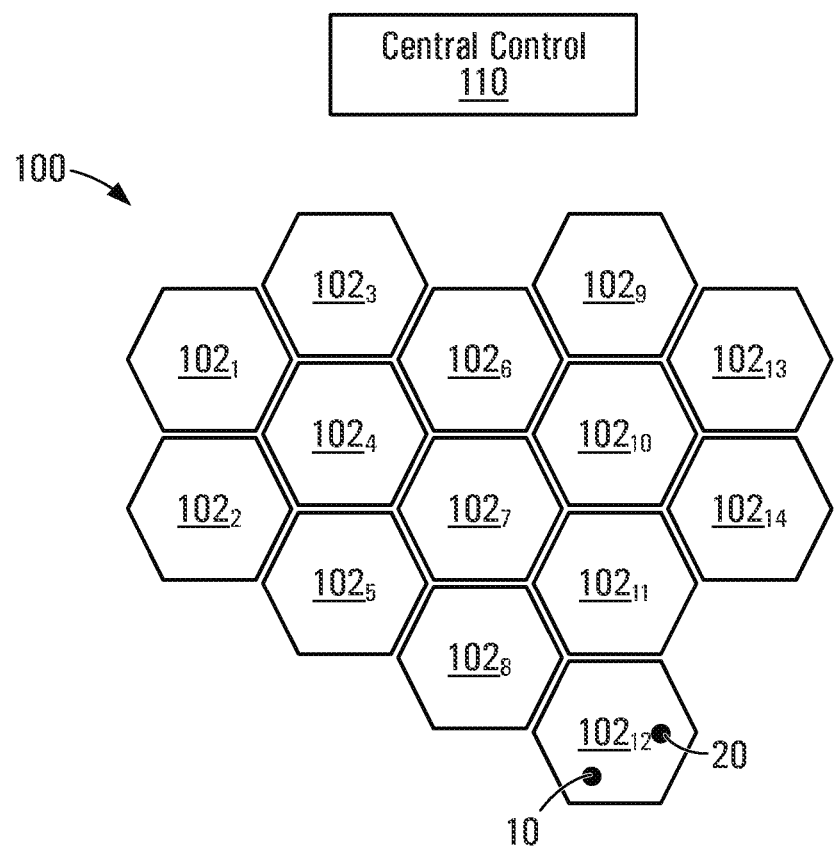
FIG. 1 is an illustration of a cellular network according to an embodiment of the disclosure.

FIG. 1 illustrates an exemplary cellular network 100 according to an embodiment of the disclosure. The cellular network 100 may include a plurality of cells $102_1$, $102_2$, $102_3$, $102_4$, $102_5$, $102_6$, $102_7$, $102_8$, $102_9$, $102_{10}$, $102_{11}$, $102_{12}$, $102_{13}$, and $102_{14}$ (collectively referred to as cells 102). As is apparent to persons of ordinary skill in the art, each of the cells 102 represents a coverage area for providing cellular services of the cellular network 100 through communication from a network access equipment (e.g., eNB). While the cells 102 are depicted as having nonoverlapping coverage areas, persons of ordinary skill in the art will recognize that one or more of the cells 102 may have partially overlapping coverage with adjacent cells. In addition, while a particular number of the cells 102 are depicted, persons of ordinary skill in the art will recognize that a larger or smaller number of the cells 102 may be included in the cellular network 100.

One or more UEs 10 may be present in each of the cells 102. Although only one UE 10 is depicted and is shown in only one cell 102$_{12}$, it will be apparent to one of skill in the art that a plurality of UEs 10 may be present in each of the cells 102. A network access equipment 20 in each of the cells 102 performs functions similar to those of a traditional base station. That is, the network access equipments 20 provide a radio link between the UEs 10 and other components in a telecommunications network. While the network access equipment 20 is shown only in cell 102$_{12}$, it should be understood that network access equipment would be present in each of the cells 102.

Figure 2:
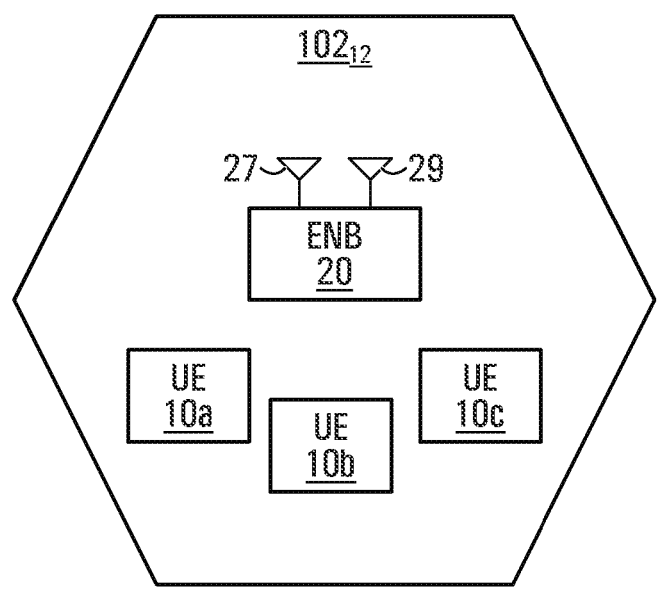
FIG. 2 is an illustration of a cell in a cellular network according to an embodiment of the disclosure.

FIG. 2 depicts a more detailed view of the cell 102$_{12}$. The network access equipment 20 in cell 102$_{12}$ may promote communication via a transmitter 27, a receiver 29, and/or other well known equipment. Similar equipment might be present in the other cells 102. A plurality of UEs 10 are present in the cell 102$_{12}$, as might be the case in the other cells 102. In the present disclosure, the cellular systems or cells 102 are described as engaged in certain activities, such as transmitting signals; however, as will be readily apparent to one skilled in the art, these activities would in fact be conducted by components comprising the cells.

In each cell, the transmissions from the network access equipment 20 to the UEs 10 are referred to as downlink transmissions, and the transmissions from the UEs 10 to the network access equipment 20 are referred to as uplink transmissions. The UE may include any device that may communicate using the cellular network 100. For example, the UE may include devices such as a cellular telephone, a laptop computer, a navigation system, or any other devices known to persons of ordinary skill in the art that may communicate using the cellular network 100.

Figure 3:
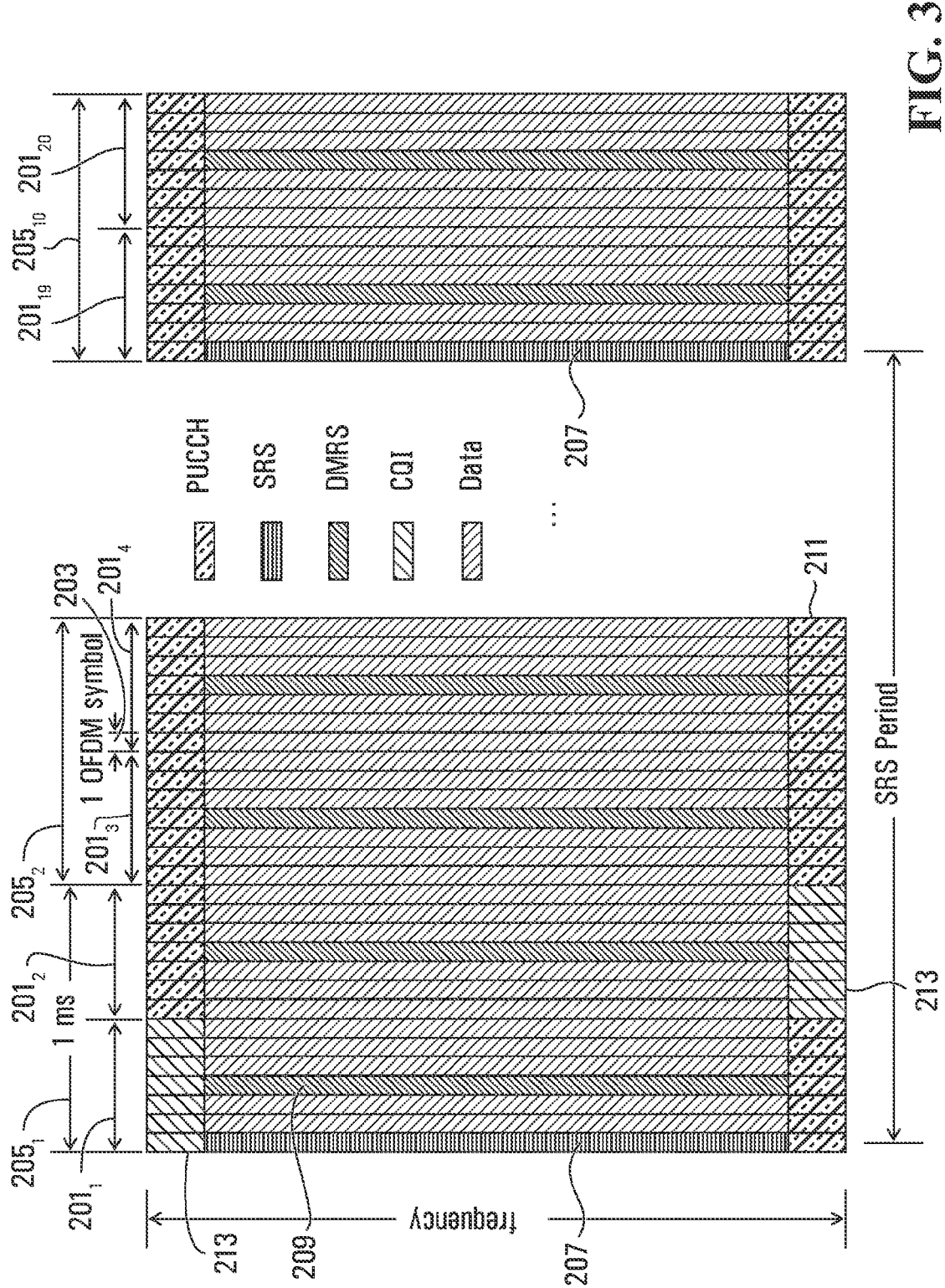
FIG. 3 is an illustration of a possible uplink transmission channel.

The format of an example of an uplink channel is shown schematically in FIG. 3. The transmission can be one of a number of different bandwidths (e.g., 1.25, 5, 15, or 20 MHz). In the time domain, the uplink is broken into frames, sub-frames and slots. Each slot 201 (shown as slots 201$_1$, 201$_2$, . . . , 201$_{19}$, 201$_{20}$, collectively slots 201) is made up of seven orthogonal frequency division multiplexed (OFDM) symbols 203. Two slots 201 make up a sub-frame 205 (sub-frames 205$_1$, 205$_2$, . . . , 205$_{10}$, collectively are sub-frames 205). A frame is a collection of 10 contiguous sub-frames. Because the exact details of a sub-frame 205 may very depending upon the exact implementation, the following description is provided as an example only. The UE will transmit using a constant-amplitude and zero-autocorrelation (CAZAC) sequence so that more than one UE may transmit simultaneously. The demodulation (DM) reference symbol (RS) is placed on the fourth symbol 209 of each slot; and the control channel 211 is taken up by at least one resource block on the very outside edges of the frequency band.

Uplink reference signal transmission opportunities for channel quality assessment and/or timing alignment (e.g. SRS (sounding reference signal)) transmission opportunities may exist anywhere in each sub-frame 205 and most likely at the beginning, or end. Each such transmission opportunity is broken down into several blocks of 12 sub-carriers that correspond to the same frequency bandwidth as a resource block. A UE may use one or all of those frequency blocks depending on the transmission bandwidth selected. The UE may also use every other sub-carrier in one or more multiple blocks. In the illustrated example, an SRS is shown in the first symbol 207 of the sub-frame 205$_1$ and of sub-frame 201$_{19}$. FIG. 3 also shows where in time and frequency that the physical uplink control channel (PUCCH) 211 is placed. Control signaling takes place in the PUCCH. In one embodiment, the system implements a hybrid automatic repeat request (HARQ) acknowledgement (ACK)/negative acknowledgement (NACK) feedback. An ACK or NACK is sent on the PUCCH 211 by the UE to the eNB to indicate whether a packet transmitted from the eNB was received at that UE. The physical uplink shared channel (PUSCH) is used to send user data.

The above description of the uplink channel is one implementation of an uplink channel. It will be appreciated that other uplink channel configurations may be used wherein an uplink reference signal transmission (e.g., SRS) is sent during any portion of the uplink message, not necessarily only at the beginning or end of a specified time interval (e.g., slot).

Figure 4:
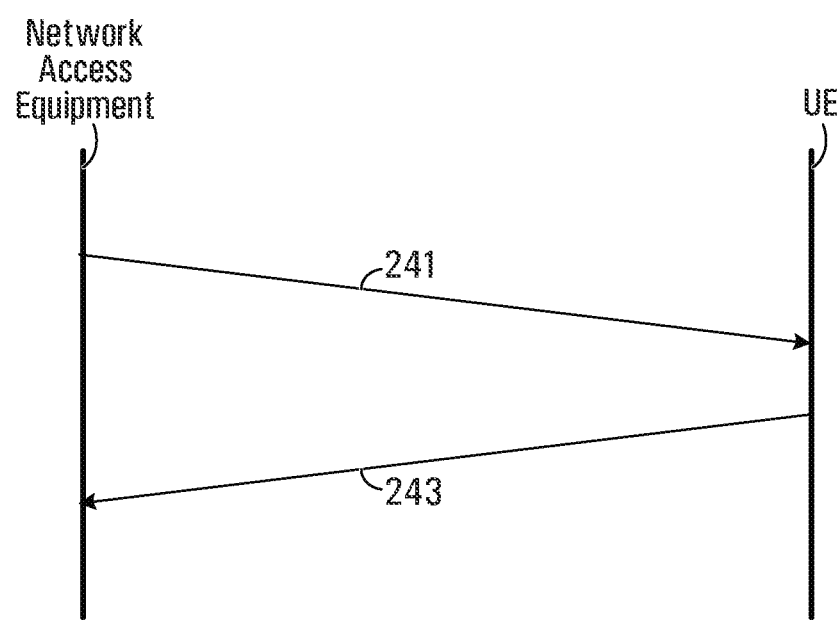
FIG. 4 is a timing diagram.

In order to maintain uplink synchronization, it is desirable for the network access equipment 20 (shown in FIG. 1) to calculate the uplink channel conditions by analyzing signals sent from the UE 10. One possible timing diagram of signals sent between the network access equipment 20 and the UE 10 is shown in FIG. 4, In this embodiment, the network access equipment 20 instructs the UE 10 when to send an uplink reference signal transmission (e.g., SRS), through use of an uplink reference signal transmission instruction message 241. The uplink reference signal transmission instruction message 241 may include any one of a variety of instructions. For example, the network access equipment 20 may instruct the UE 10 via the reference signal transmission instruction message 241 to send the reference signal transmissions at a constant rate, or in bursts depending on the velocity of the UE 10 relative to the network access equipment 20. In response 243, the UE 10 may send the reference signal transmissions (e.g., SRS) in accordance with the instructions of the network access equipment 20.

In order to conserve battery power in the UE, the UE may operate with discontinuous reception (DRX). Typically, the UE will turn its reception capability on and off in a repeating fashion. The network is aware of the DRX behavior and makes its transmission to the UE during periods that the reception capability is on. An On period followed by an Off period is a DRX cycle.

DRX in Connected Mode will be configured by the network. Part of the configuration is the setting of the DRX-cycle On Duration, inactivity timers and HARQ timer. During the On periods (periods the receiver is on each having a length specified by the On Duration), the UE will monitor the PDCCH (packet data control channel) or configured resource for the allocation of possible downlink and uplink transmissions. When a PDCCH is decoded successfully, an inactivity timer will be started. At the end of the On period, the UE may go back to sleep according to the DRX configuration.

Transmission of Uplink Reference Signal in Anticipation of Uplink Transmission

In some embodiments, the UE does not transmit an uplink reference signal until it determines that it has uplink data to send. Upon making such a determination, the UE transmits the uplink reference signal in anticipation of the uplink transmission, for example slightly before the start of the uplink transmission, and during the uplink transmission. The UE then stops transmitting the uplink reference signal after completion of the uplink transmission. A flowchart of the method will be described with reference to FIG. 5. The method begins with controlling a receiver in the user equipment to have on periods and off periods at block 5-1. Note that these on and off periods may for the most part be periodic or for the most part periodic in some embodiments, but more generally they need not be necessarily periodic. The method continues in block 5-2 with starting uplink reference signal transmission in anticipation of transmitting uplink data. The method continues at block 5-3 with the user equipment transmitting uplink data after having started uplink reference signal transmission. At block 5-4, the user equipment continues uplink reference signal transmission until completion of transmission of the uplink data.

Figure 5:
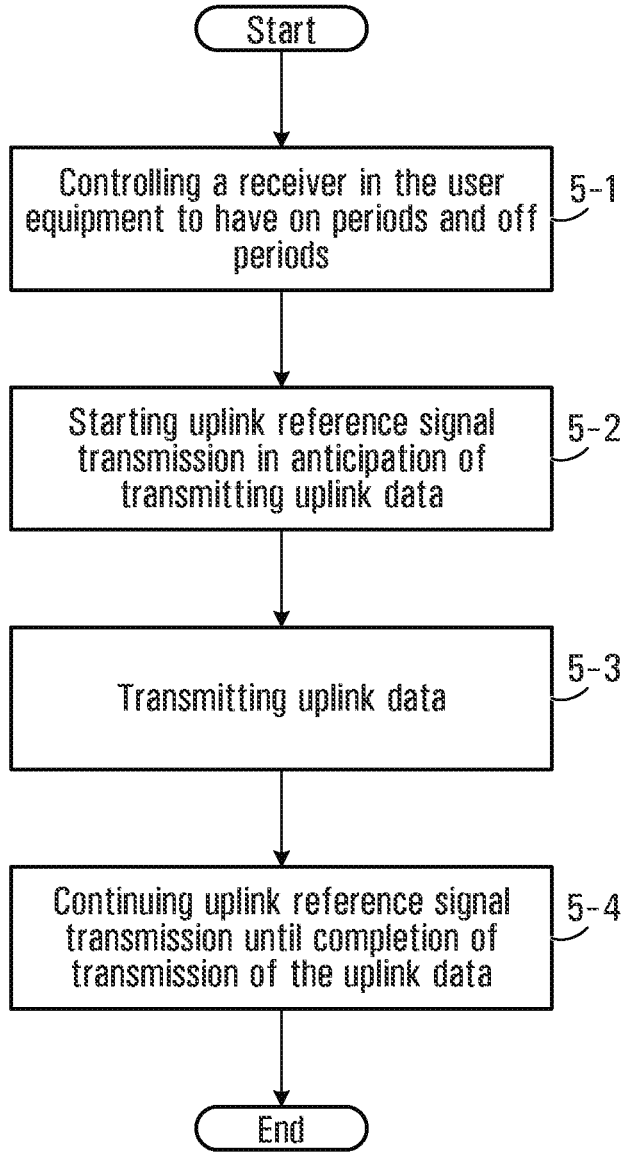
FIG. 5 is a flowchart showing an example of a method of uplink reference signal transmission.

The embodiment of FIG. 5 assumes that the uplink reference signal transmission in anticipation of uplink data transmission is in the context of DRX control of the receiver. In another embodiment, blocks 5-2,5-3,5-4 are executed by a user equipment that is not operating in DRX mode in which case block 5-1 can be omitted.

Figure 6:
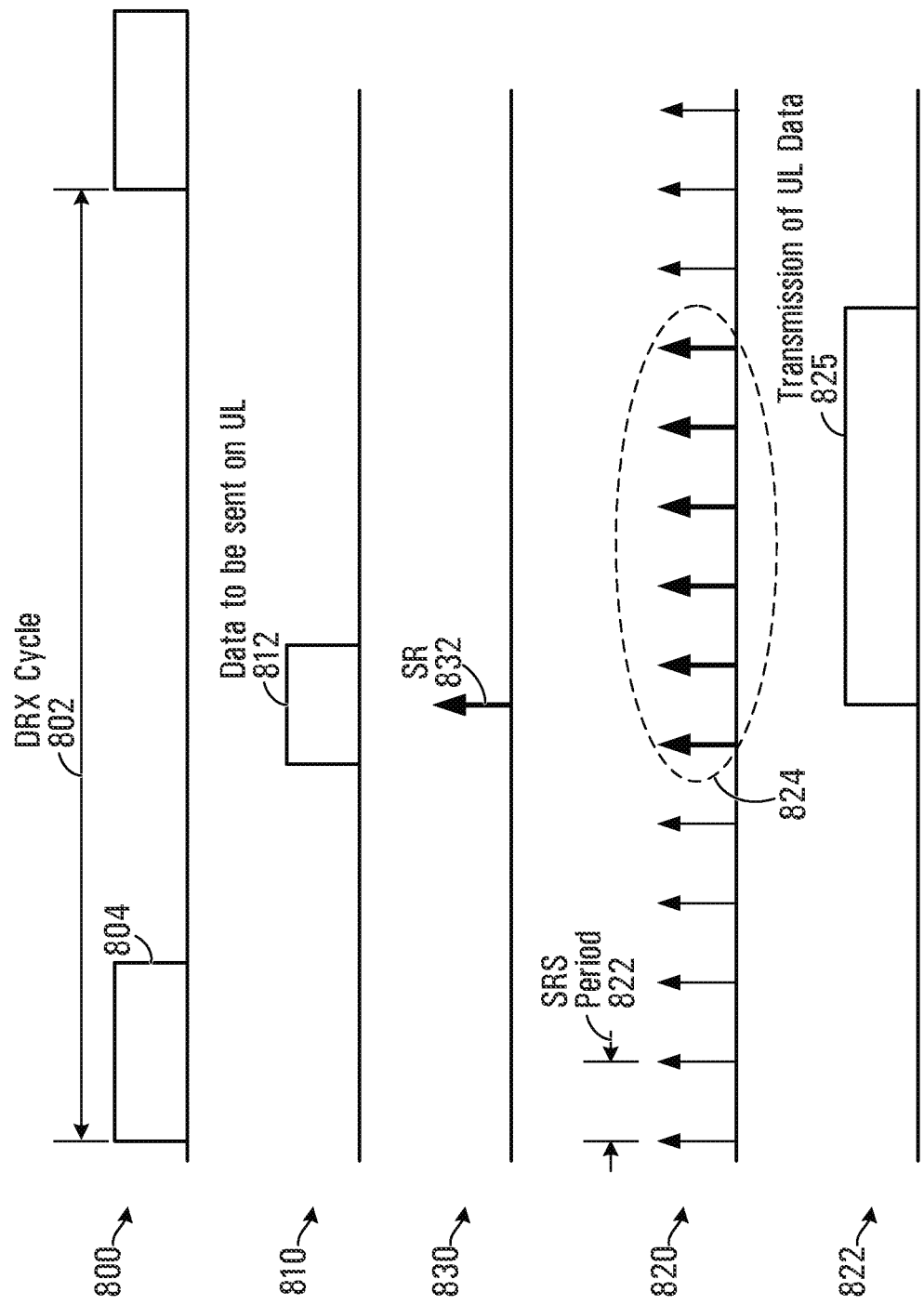
FIG. 6 is a timing diagram showing an example of uplink reference signal timing.

Referring now to FIG. 6, a specific example will be described. In this example and all of the examples that follow, the reference signals are assumed to be SRS transmissions. It is to be understood that all of the examples given have application more generally to reference signals. FIG. 6 shows the timing of various signals for a UE in DRX mode. Shown is DRX timing 800 for a DRX cycle assignment, timing 810 for availability of data for transmission, timing 822 for uplink data transmission, a scheduling request timing indicated at 830, and SRS timing indicated at 820. The DRX timing 800 consists of a DRX cycle 802 that includes a DRX On Duration (indicated at 804) and a DRX Off Duration. The receiver is alternately turned on for On periods having the DRX On Duration and off for Off periods having the DRX Off Duration. The SRS timing 820 has an SRS period 822. This represents the timing of an uplink resource that is available for SRS transmission. More generally, the UE maintains a definition of an available set of uplink reference signal transmission opportunities. In some embodiments, information defining these transmission opportunities is contained in signalling information transmitted to the UE by the network. In the illustrated example, the uplink resource is a periodic resource but in other embodiments, the resource is not necessarily periodic. In the illustrated example, there is a ratio of 12 SRS periods to one DRX cycle 802 but this is implementation specific. As described below, an SRS is not transmitted at every opportunity. The timing 810 of the availability of data to be sent on the uplink may for example indicate when data arrives in a buffer for transmission. For the purpose of this example, it is assumed that data is available at 812 for transmission on the uplink. For the specific example indicated, the scheduling request timing 830 shows a scheduling request transmitted by the UE at 832 in respect of the data available at 812. In some embodiments, a scheduling request is an indication sent by the UE to the base station to request a previously assigned uplink resource that may be semi-persistent in nature; this means that the same resource is assigned each time the UE requests the resource so that details of the assignment do not need to be signaled each time. The timing of the resulting uplink data transmission is indicated at 825. The uplink transmission may for example occur using a semi-persistent resource. More generally, for the example of FIG. 6, the SRS behaviour can be in respect of any uplink transmission; this may involve transmissions using a semi-persistent resource, or dynamically scheduled transmissions to name a few examples.

In the illustrated example, data arrives at 812 for transmission on the uplink between DRX On Durations. Rather than waiting until the next On Duration to transmit the SR at 832, the UE is allowed to transmit when it receives data for transmission. In some embodiments, the UE transmits the SR (more generally the UE requests an uplink transmission resource using some request mechanism) using an assigned scheduling request channel assignment at the next available opportunity after the start of receipt of data for uplink transmission. In some embodiments, in the event DRX control has the receiver off when the SR is transmitted, the UE will turn on its receiver in order to receive an uplink grant. The request may for example be sent using an uplink resource previously assigned for that purpose; it may be a dedicated resource for a given UE or a contention-based resource to name a few examples. This may reduce average UL latencies and problems with channel congestion during On Durations Cycles that may occur when the UE is restricted to transmitting during DRX On Cycle Durations. In such embodiments, the request for the uplink transmission resource and the subsequent transmission of the uplink data are both performed irrespective of the on and off periods of the receiver. In some embodiments, the network transmits signalling to the UE to configure the user equipment to be able to transmit the request for the uplink transmission resource and to transmit the uplink data irrespective of the on and off periods of the receiver. In other embodiments, the UE is able to behave in this manner without receiving signalling from the network.

SRS transmission is triggered in anticipation of data transmission 825. Specifically, as shown, SRS transmission occurs over a period 824 which encompasses the timing of the uplink data transmission 825. After data arrives to be sent by the UE, the SRS is transmitted. The SRS transmission starts before data transmission starts and is discontinued after the data has been transmitted. In some embodiments, this involves continuing uplink reference signal transmission until a last of the available set of uplink reference signal transmission opportunities that occur during uplink data transmission and then discontinuing reference signal transmission as shown for the example of FIG. 6.

In some embodiments, after transmission of an SR (such as at 832), the network responds with an uplink grant on a downlink control channel, such as the PDCCH (packet data control channel) described in TS 36.211 (see section 6) hereby incorporated by reference in its entirety. In some embodiments, an inactivity timer is used to control when to discontinue SRS transmission. For example, receipt of the uplink grant may be used as a trigger to start an inactivity timer. The SRS transmission is discontinued after the inactivity timer expires.

SRS Transmission at Closest SRS Transmission Opportunity in the Uplink Before Uplink Resource Request In some embodiments, the UE starts making SRS transmissions at the closest SRS transmission opportunity in the uplink before making an uplink resource request. In such embodiments, the mobile device maintains a definition of a set of available SRS transmission opportunities as described previously. The latest of these opportunities that occurs prior to making an uplink resource request is the one within which the SRS transmission starts. The example of FIG. 6 illustrates this. It can be seen that SRS transmission opportunity 825 is the latest SRS transmission opportunity that occurs prior to transmitting the SR at 832.

In some embodiments, this behaviour is in respect of an uplink resource request for a semi-persistent resource; this may for example involve using the above described SR mechanism; in some embodiments, this behaviour is in respect of an uplink resource request that is a transmitted using a contention based access mechanism (for example the RACH (random access channel) mechanism described in TS 36.211 (see section 5); finally, in some embodiments, both the SR and contention based resource request mechanisms are available to trigger this behaviour.

Various mechanisms have been described to trigger the start of SRS transmission in anticipation of data transmission. Various mechanisms are also provided to stop SRS transmission. The first example was described above and involved starting an inactivity timer upon receipt of an uplink grant the SRS transmission stops upon expiry of the inactivity timer.

In another embodiment, the UE will simply stop the SRS transmission at the end of the data transmission; in some embodiments at the earliest opportunity after data transmission has finished.

In some embodiments, SRS is transmitted during an original data transmission and any retransmissions/HARQ processes that may follow. The SRS transmission is transmitted from before data transmission until completion of any retransmissions/HARQ processes.

In other embodiments, the SRS transmission is transmitted from before transmission of an original data transmission until completion of the original data transmission after which SRS transmission is stopped. In the event that retransmissions are necessary, SRS transmission is restarted in order to cover the retransmissions. As in the case for original transmissions, this starts in anticipation of the retransmission and continues until completion of the retransmission.

Reference Signal Timing Alignment

In some embodiments, reference signal transmissions are made for two different purposes:

a) to allow the network to assess the quality of the uplink channel so that the network can determine an appropriate adaptive modulation and encoding for uplink transmissions;

b) uplink timing alignment, as described previously.

The transmissions are the same in either case, but the network may need them with differing timing constraints. For example, the network may need the reference signal for uplink channel quality assessment more frequently than for uplink timing alignment. In some embodiments, rather than the UE making these reference signal transmissions for timing alignment independently of reference signal transmissions for uplink channel assessment, the UE aligns the timing of these two reference signal transmissions whenever possible and when the timing is aligned, only a single reference signal transmission is made.

Figure 7:
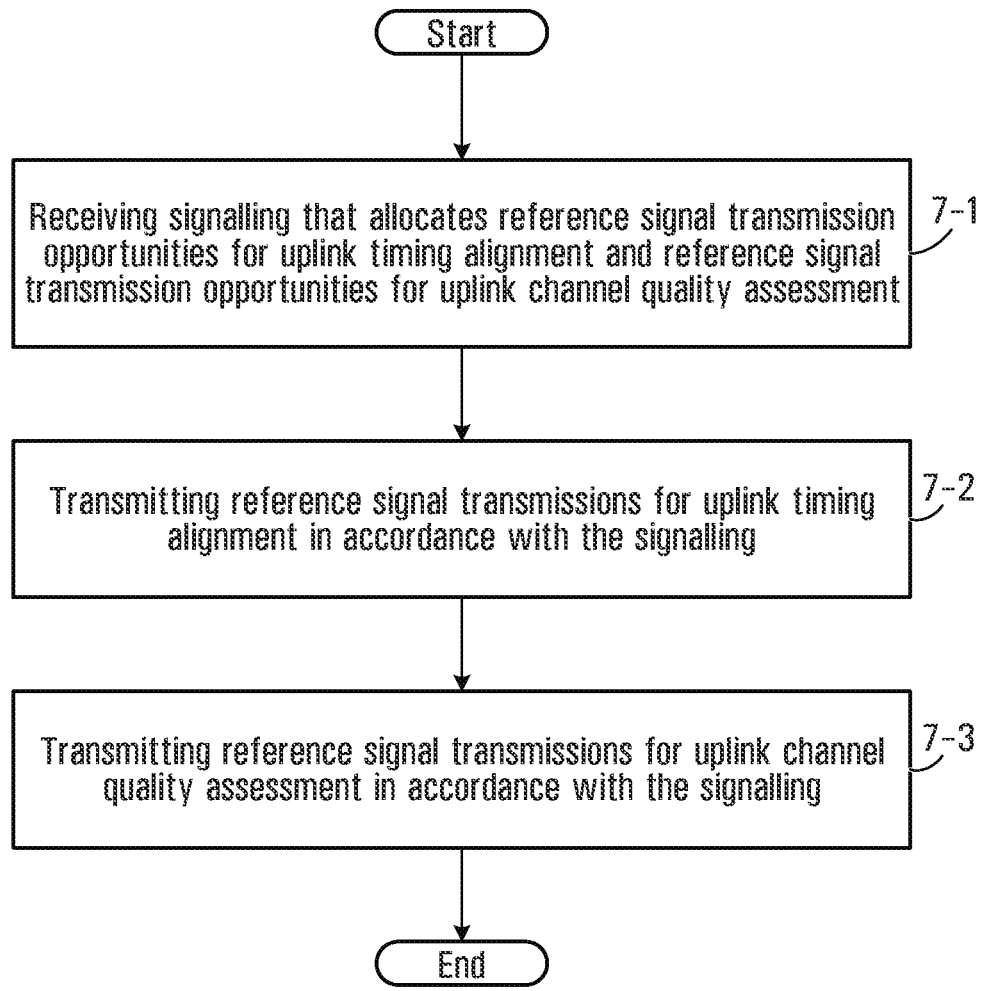
FIG. 7 is a flowchart of a method of uplink reference signal transmission by a UE.

Specifically, the network assigns the UE reference signal transmission opportunities for timing alignment and reference signal transmission opportunities for uplink channel quality assessment. For each reference signal transmission opportunity, a single reference signal is transmitted if the current opportunity is aligned with one or both of the timing alignment or uplink channel quality assessment requirements. In some embodiments, this reference signal behaviour is predicated on reference signal transmission being enabled, for example using any of the mechanisms described in previous embodiments. A specific example of this method from the perspective of the UE will be described with reference to the flowchart of FIG. 7. The method begins at block 7-1 with the UE receiving signalling that allocates reference signal transmission opportunities for uplink timing alignment and reference signal transmission opportunities for uplink channel quality assessment. Some of the reference signal transmission opportunities for uplink timing alignment may coincide with reference signal transmission opportunities for uplink channel quality assessment. The method continues at block 7-2 with transmitting reference signal transmissions for uplink timing alignment in accordance with the signalling, and at block 7-3 transmitting reference signal transmissions for uplink channel quality assessment in accordance with the signalling. In so doing, transmitting reference signal transmissions for uplink timing alignment in accordance with the signalling and transmitting reference signal transmissions for uplink channel quality assessment in accordance with the signalling is achieved by transmitting a single reference signal transmission for both uplink timing alignment and uplink channel quality assessment for any reference signal transmission opportunities for uplink timing alignment that coincide with reference signal transmission opportunities for uplink channel quality assessment.

Figure 8:
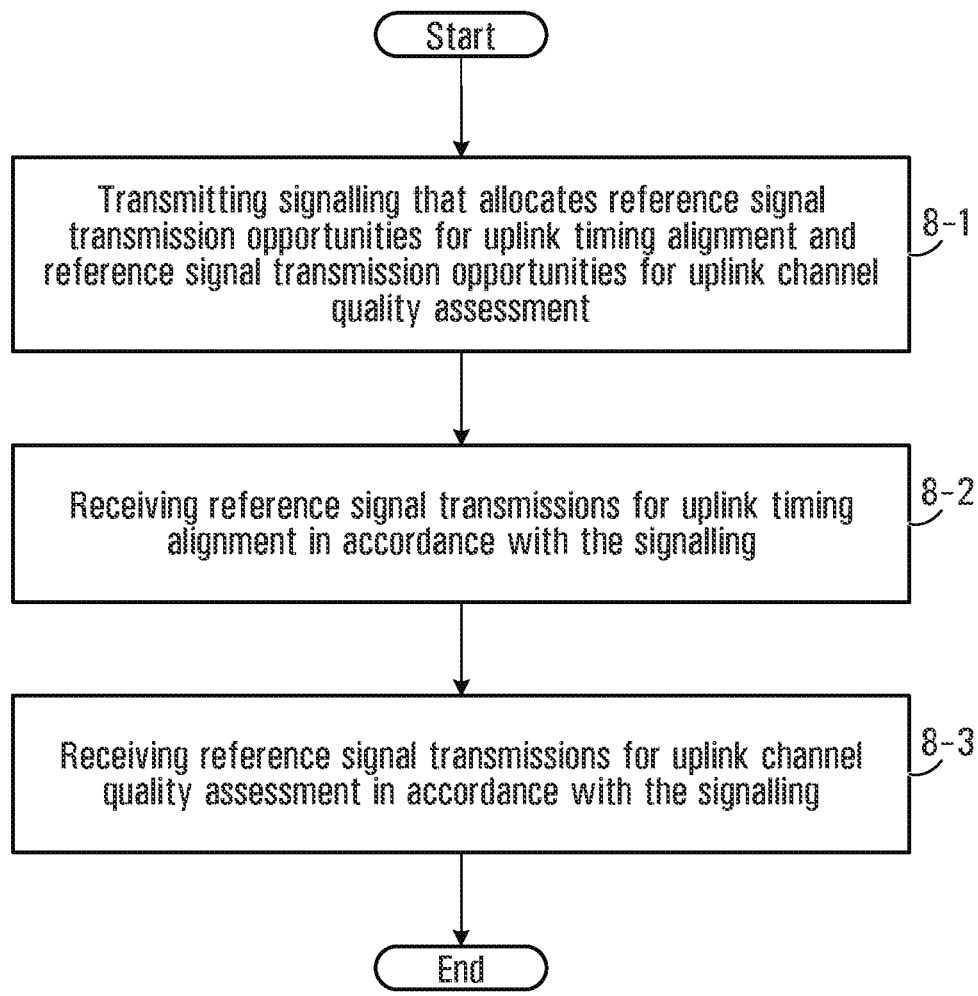
FIG. 8 is a flow chart of a method in network access equipment that corresponds with the method of FIG. 7.

An example of this method from the perspective of the network will be described with reference to the flowchart of FIG. 8. The method begins at block 8-1 with the network transmitting signalling that allocates reference signal transmission opportunities for uplink timing alignment and reference signal transmission opportunities for uplink channel quality assessment. The method continues at block 8-2 with receiving reference signal transmissions for uplink timing alignment in accordance with the signalling, and at block 8-3 receiving reference signal transmissions for uplink channel quality assessment in accordance with the signalling. In so doing, receiving reference signal transmissions for uplink timing alignment in accordance with the signalling and receiving reference signal transmissions for uplink channel quality assessment in accordance with the signalling comprised receiving a single reference signal transmission for both uplink timing alignment and uplink channel quality assessment for any reference signal transmission opportunities for uplink timing alignment that coincide with reference signal transmission opportunities for uplink channel quality assessment.

In some embodiments, the network transmits signalling information that contains a definition of reference signal transmission opportunities to be made available for one or both of channel quality assessment and timing alignment. In addition, the signalling information includes information identifying a minimum period for transmission of the reference signal for channel quality assessment and/or a minimum period for transmission of the reference signal for timing alignment. The UE makes reference signal transmissions in accordance with the definition of reference signal transmission opportunities, and subject to the minimum period(s) such that whenever possible a single reference signal is sent for both channel quality assessment and timing alignment.

As a specific example, consider that a basic set of SRS transmission opportunities may be defined with a periodicity of 10 ms; the SRS for channel quality assessment may be required every 10 ms while the UE is transmitting; the SRS for timing alignment may be required every 30 ms irrespective of whether the UE is transmitting. This information is used by the UE to send a single SRS every 10 ms while the UE is transmitting in satisfaction of both requirements, and a single SRS every 30 ms while the UE is not transmitting.

Figure 9:
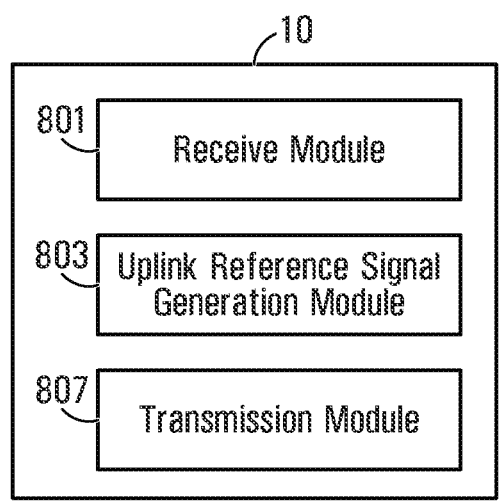
FIG. 9 is an exemplary diagram of modules in the UE.

In some embodiments, in order to carry out the above process, the UE 10 comprises a processor capable of performing the above process. For simplicity, the different functions have been broken out into different modules. These modules may be implemented separately or together. Further, these modules may be implemented in hardware, software, or some combination. Finally, these modules may reside in different portions of the UE memory. As illustrated in FIG. 9, the UE processor comprises a receive module 801, an uplink reference signal generation module 803, and a transmission module 807. The receive module 801 receives communications from the network. These may for example include a message or messages configuring the on and off periods for the receiver, and configuring various resources for the receiver, such as the transmission opportunities for the uplink reference signal, and uplink grants. The transmission module 807 makes uplink transmissions, including data transmissions and uplink timing alignment signal transmissions. These can be part of an integrated frame structure as described previously with reference to FIG. 3 by way of example. The uplink reference signal generation module 803 generates uplink reference signal transmissions for transmission by the transmission module 807 such that uplink reference signal transmissions occur in anticipation of and during data transmissions. This can occur using any of the methods described earlier, for example.

Figure 10:
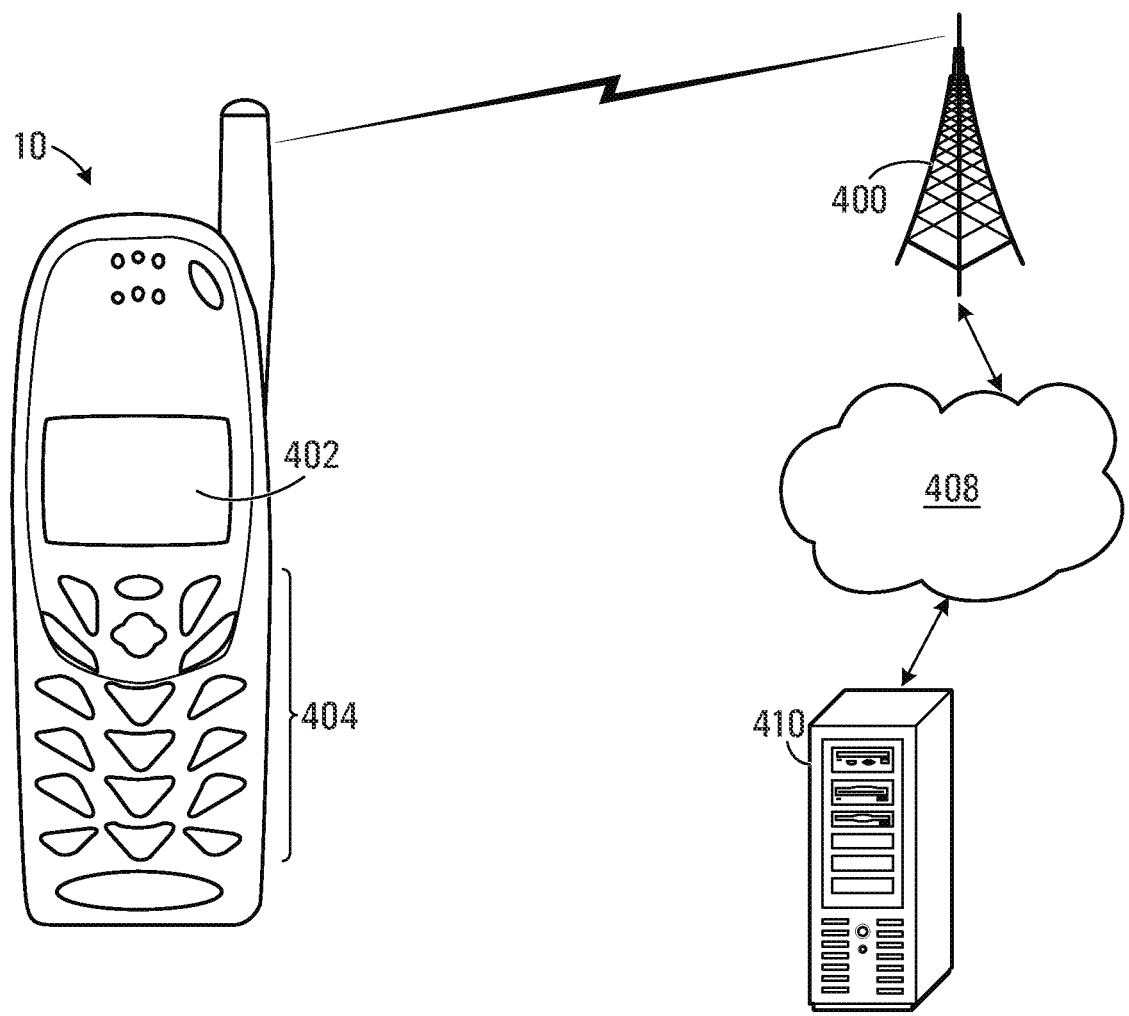
FIG. 10 is a diagram of a wireless communications system including a mobile device operable for some of the various embodiments of the disclosure.

FIG. 10 illustrates a wireless communications system including an embodiment of the UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 10 may be a portable, laptop or other computing device. The UE 10 may support specialized activities such as gaming, inventory control, job control, and/or task management functions, and so on.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a track wheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 402 to show a web page. The web page may be obtained via wireless communications with a wireless network access node, a cell tower, a peer UE 10, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402. Alternately, the UE 10 may access the network 400 through a peer UE 10 acting as an intermediary, in a relay type or hop type of connection.

Figure 11:
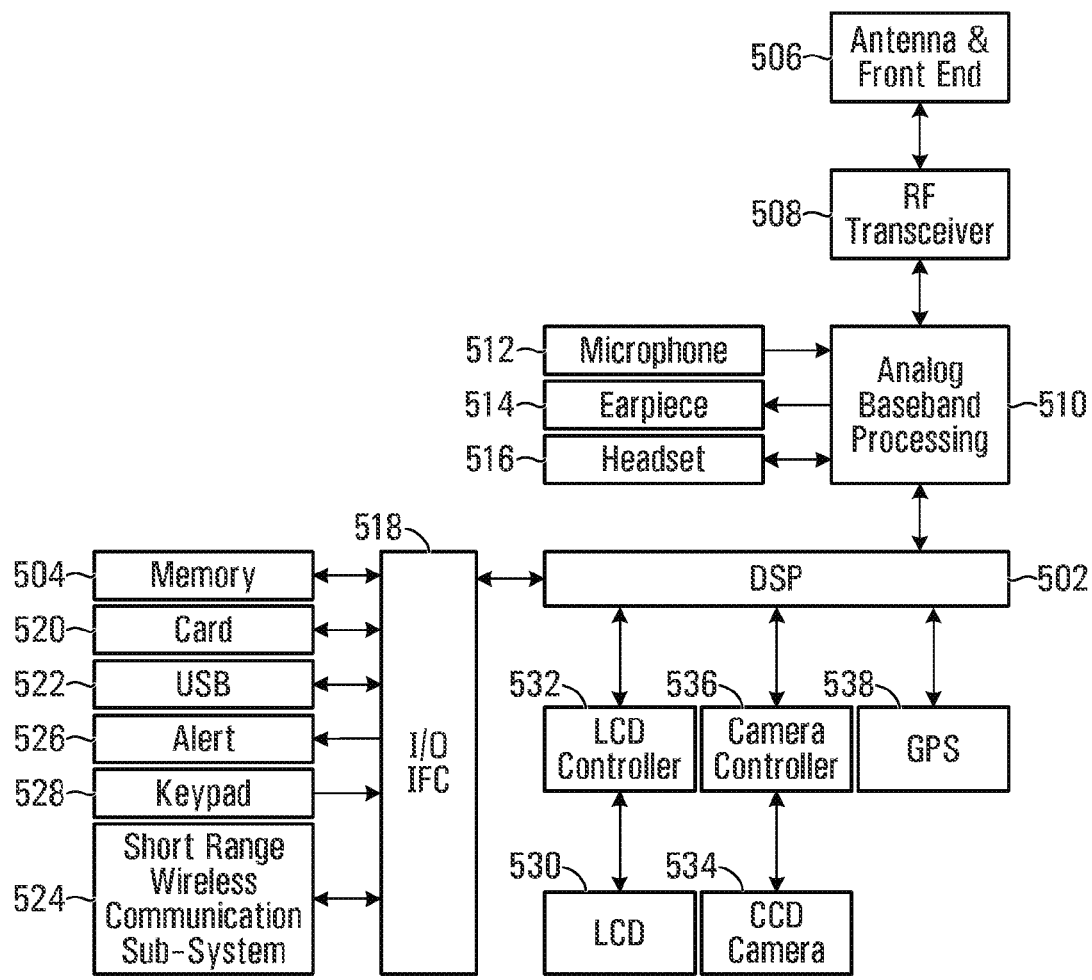
FIG. 11 is a block diagram of a mobile device operable for some of the various embodiments of the disclosure.

FIG. 11 shows a block diagram of the UE 10. While a variety of known components of UEs 10 are depicted, in an embodiment a subset of the listed components and/or additional components not listed may be included in the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network or from a peer UE 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/de-interleaving, spreading/de-spreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/de-interleaving, spreading/de-spreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform de-spreading, de-interleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, de-interleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a track wheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 10 to determine its position. Various other peripherals may also be included to provide additional functions, e.g., radio and television reception.

Figure 12:
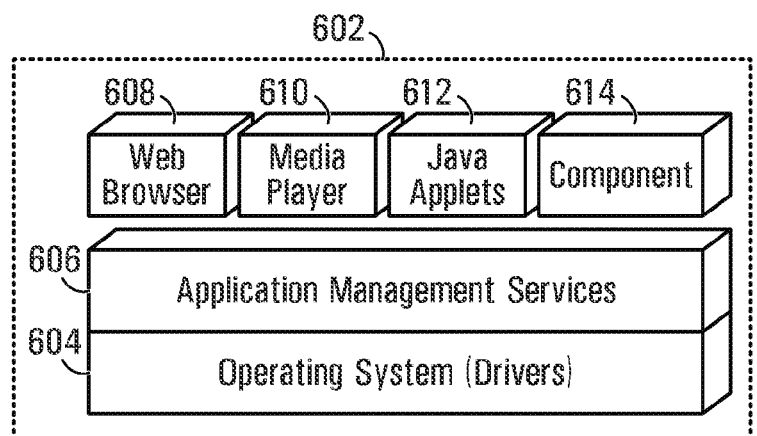
FIG. 12 is a diagram of a software environment that may be implemented on a mobile device operable for some of the various embodiments of the disclosure.

FIG. 12 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 10. Also shown in FIG. 12 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audiovisual media. The Java applets 612 configure the UE 10 to provide games, utilities, and other functionality. A component 614 might provide functionality related to the present disclosure.

Figure 13:
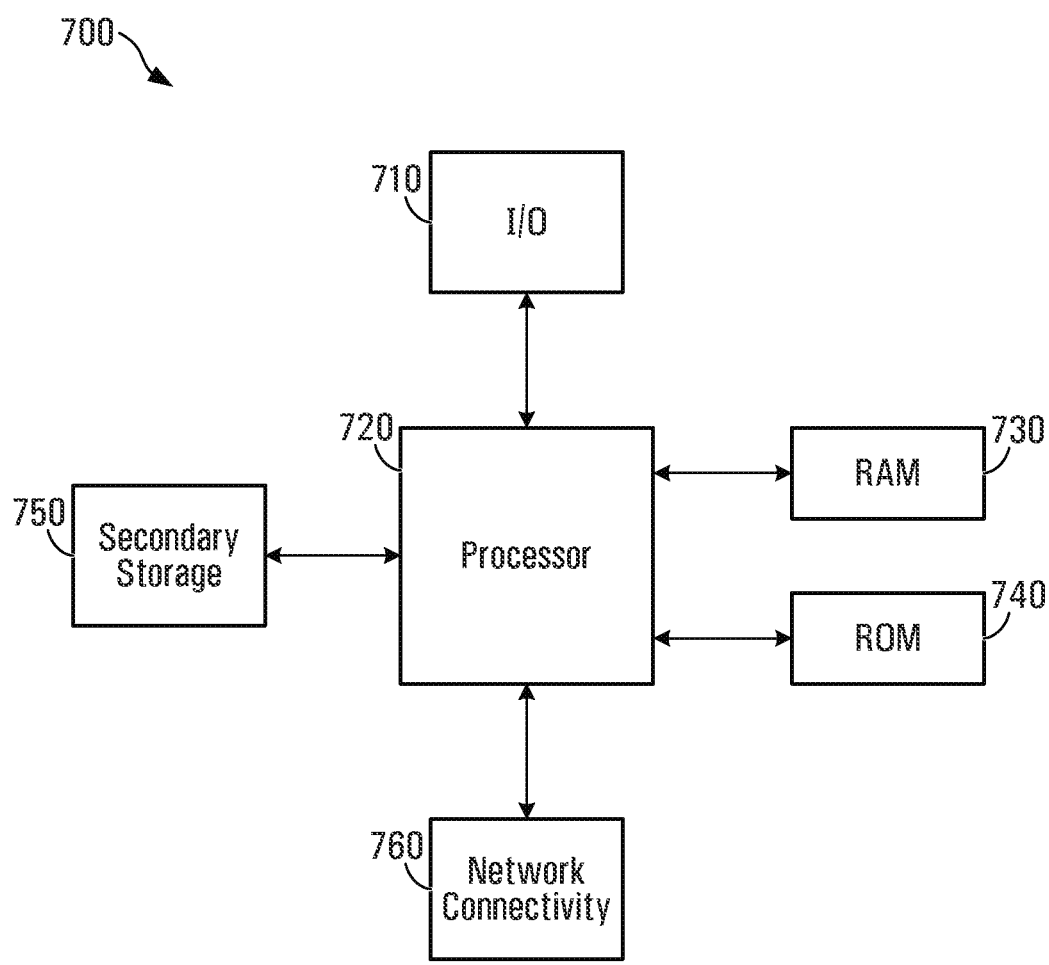
FIG. 13 is an exemplary general purpose computer according to one embodiment of the present disclosure.

The UEs 10, ENBs 20, and central control 110 of FIG. 1 and other components that might be associated with the cells 102 may include any general-purpose computer with sufficient processing power, memory resources, and network throughput capability to handle the necessary workload placed upon it. FIG. 13 illustrates a typical, general-purpose computer system 700 that may be suitable for implementing one or more embodiments disclosed herein. The computer system 700 includes a processor 720 (which may be referred to as a central processor unit or CPU) that is in communication with memory devices including secondary storage 750, read only memory (ROM) 740, random access memory (RAM) 730, input/output (I/O) devices 700, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 700 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk-based systems may all be considered secondary storage 750), ROM 740, RAM 730, or the network connectivity devices 760. While only one processor 720 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method in a user equipment, the method comprising:
operating the user equipment using discontinuous reception (DRX) control, the DRX control causing a receiver to monitor downlink transmissions during configured on periods;
determining that the user equipment has data for uplink transmission; and
responsive to the determination, without waiting for a next configured on period:
transmitting an uplink scheduling request;
transmitting sounding reference signal transmissions in a set of sounding reference signal transmission resources; and
responsive to transmitting the uplink scheduling request, causing the DRX control to activate the receiver.

2. The method of claim 1, wherein transmitting the sounding reference signal transmissions continues while there is data for uplink transmission.

3. The method of claim 1, wherein the set of sounding reference signal transmission resources repeat periodically.

4. The method of claim 1, further comprising starting an inactivity timer upon reception of an uplink grant.

5. The method of claim 4, wherein transmitting the sounding reference signal transmissions comprises transmitting a sounding reference signal transmission in at least one of the sounding reference signal transmission resources of the set of sounding reference signal transmission resources until the inactivity timer expires.

6. The method of claim 4, wherein transmitting the sounding reference signal transmissions comprises transmitting sounding reference signal transmissions in the set of sounding reference signal transmission resources until the inactivity timer expires.

7. The method of claim 1, wherein transmitting the uplink scheduling request includes using scheduling request channel assignment assigned to the user equipment.

8. The method of claim 7, wherein the uplink scheduling request is transmitted at a next available opportunity of the assigned scheduling request channel assignment that occurs after receiving the data for uplink transmission.

9. A non-transitory computer readable medium having stored therein computer executable instructions for implementing a method in a user equipment, the method comprising:
operating the user equipment using discontinuous reception (DRX) control, the DRX control causing a receiver to monitor downlink transmissions during configured on periods;
determining that the user equipment has data for uplink transmission; and
responsive to the determination, without waiting for a next configured on period:
transmitting an uplink scheduling request;
transmitting sounding reference signal transmissions in a set of sounding reference signal transmission resources; and
responsive to transmitting the uplink scheduling request, causing the DRX control to activate the receiver.

10. The computer readable medium of claim 9, wherein transmitting the sounding reference signal transmissions continues while there is data for uplink transmission.

11. The computer readable medium of claim 9, wherein the set of sounding reference signal transmission resources repeat periodically.

12. The computer readable medium of claim 9, the instructions further comprising starting an inactivity timer upon reception of an uplink grant.

13. The computer readable medium of claim 12, wherein transmitting the sounding reference signal transmissions comprises transmitting a sounding reference signal transmission in at least one of the sounding reference signal transmission resources of the set of sounding reference signal transmission resources until the inactivity timer expires.

14. The computer readable medium of claim 12, wherein transmitting the sounding reference signal transmissions comprises transmitting sounding reference signal transmissions in the set of sounding reference signal transmission resources until the inactivity timer expires.

15. The computer readable medium of claim 9, wherein transmitting the uplink scheduling request includes using scheduling request channel assignment assigned to the user equipment.

16. The computer readable medium of claim 15, wherein the uplink scheduling request is transmitted at a next available opportunity of the assigned scheduling request channel assignment that occurs after receiving the data for uplink transmission.

17. A user equipment for use with uplink reference signal transmission, the user equipment, comprising:
one or more processors configured to:
operate the user equipment using discontinuous reception (DRX) control, the DRX control causing a receiver to monitor downlink transmissions during configured on periods;
determine that the user equipment has data for uplink transmission; and
responsive to the determination, without waiting for a next configured on period:
a transmitter configured to transmit an uplink scheduling request;
the transmitter further configured to transmit sounding reference signal transmissions in a set of sounding reference signal transmission resources; and
responsive to transmitting the uplink scheduling request, the one or more processors further configured to cause the DRX control to activate the receiver.

18. The user equipment of claim 17, wherein transmitting the sounding reference signal transmissions continues while there is data for uplink transmission.

19. The user equipment of claim 17, wherein the set of sounding reference signal transmission resources repeat periodically.

20. The user equipment of claim 17, the one or more processor further configured to start an inactivity timer upon reception of an uplink grant.

21. The user equipment of claim 20, wherein transmitting the sounding reference signal transmissions comprises transmitting a sounding reference signal transmission in at least one of the sounding reference signal transmission resources of the set of sounding reference signal transmission resources until the inactivity timer expires.

22. The user equipment of claim 20, wherein transmitting the sounding reference signal transmissions comprises transmitting sounding reference signal transmissions in the set of sounding reference signal transmission resources until the inactivity timer expires.

23. The user equipment of claim 17, wherein transmitting the uplink scheduling request includes using scheduling request channel assignment assigned to the user equipment.

24. The user equipment of claim 23, wherein the uplink scheduling request is transmitted at a next available opportunity of the assigned scheduling request channel assignment that occurs after receiving the data for uplink transmission.

* * * * *